(12) United States Patent
Gaeddert et al.

(10) Patent No.: US 9,107,343 B1
(45) Date of Patent: Aug. 18, 2015

(54) GRASS CATCHER APPARATUS FOR A RIDING LAWNMOWER

(75) Inventors: Thomas J. Gaeddert, Newton, KS (US); Steven P. Tieszen, Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 27 days.

(21) Appl. No.: 13/240,496

(22) Filed: Sep. 22, 2011

Related U.S. Application Data

(60) Provisional application No. 61/469,200, filed on Mar. 30, 2011.

(51) Int. Cl.
*A01D 43/06* (2006.01)

(52) U.S. Cl.
CPC ...................... *A01D 43/06* (2013.01)

(58) Field of Classification Search
USPC .................... 56/199, 200, 202–206
See application file for complete search history.

(56) References Cited

U.S. PATENT DOCUMENTS

| | | | | |
|---|---|---|---|---|
| 4,031,694 A | * | 6/1977 | Gobin | 56/202 |
| 4,047,368 A | | 9/1977 | Peterson | |
| 4,158,279 A | * | 6/1979 | Jackson | 56/202 |
| 4,214,424 A | * | 7/1980 | Gobin | 56/202 |
| 4,238,918 A | * | 12/1980 | Saruhashi et al. | 114/116 |
| 4,306,408 A | * | 12/1981 | Christopherson et al. | 56/202 |
| 4,532,755 A | | 8/1985 | Schemelin et al. | |
| 4,532,756 A | | 8/1985 | Merkel | |
| 4,702,063 A | * | 10/1987 | Satoh et al. | 56/202 |
| 4,738,088 A | * | 4/1988 | Klever et al. | 56/202 |
| 4,800,712 A | * | 1/1989 | Morse et al. | 56/202 |
| RE32,954 E | | 6/1989 | Lamusga | |
| 4,868,948 A | * | 9/1989 | Arnold | 15/340.1 |
| 4,969,320 A | | 11/1990 | Langford | |
| 5,107,661 A | * | 4/1992 | Shimamura | 56/12.8 |
| 6,226,970 B1 | | 5/2001 | Busboom et al. | |
| 6,513,312 B1 | | 2/2003 | Ishimori et al. | |
| 7,121,072 B1 | | 10/2006 | Dimarco | |
| 7,219,489 B2 | * | 5/2007 | Tada et al. | 56/202 |
| 7,263,819 B2 | | 9/2007 | Samejima et al. | |
| 7,607,284 B2 | | 10/2009 | Kanai et al. | |
| 7,637,089 B2 | | 12/2009 | Yamashita et al. | |
| 2006/0272309 A1 | * | 12/2006 | Moore | 56/202 |
| 2009/0260339 A1 | * | 10/2009 | Uemura et al. | 56/202 |
| 2010/0095643 A1 | * | 4/2010 | Keene et al. | 56/10.1 |

* cited by examiner

*Primary Examiner* — Thomas B Will
*Assistant Examiner* — Mai Nguyen

(57) ABSTRACT

An apparatus for mounting grass collection bags to a riding lawn mower includes a mounting assembly fixed to a riding lawn mower frame and a lid assembly for carrying removable grass clippings collection bags. The mounting assembly includes slotted brackets that are adapted to receive transverse base pins that are fixed to the lid assembly. An operator may hang the lid assembly by its transverse base pins on the mounting assembly slotted brackets in a hanging position and then rotate the lid assembly up into a raised, operating position. As the lid assembly is rotated to the raised, operating position, a releasable latch mechanism connected to the mounting assembly receives and captures the lid assembly latch pins. With this grass clippings collection unit, a single operator can install or remove the lid assembly, making it possible to rapidly reconfigure the mower for collecting clippings or for not collecting clippings.

5 Claims, 12 Drawing Sheets

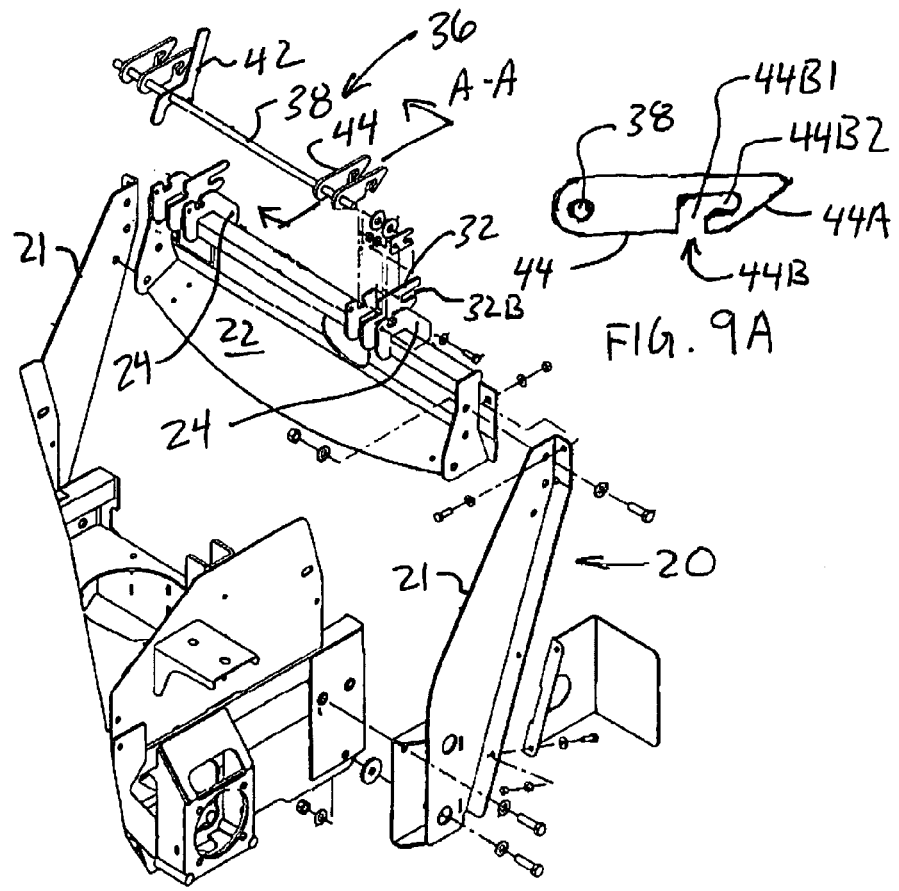
FIG. 9
FIG. 9A
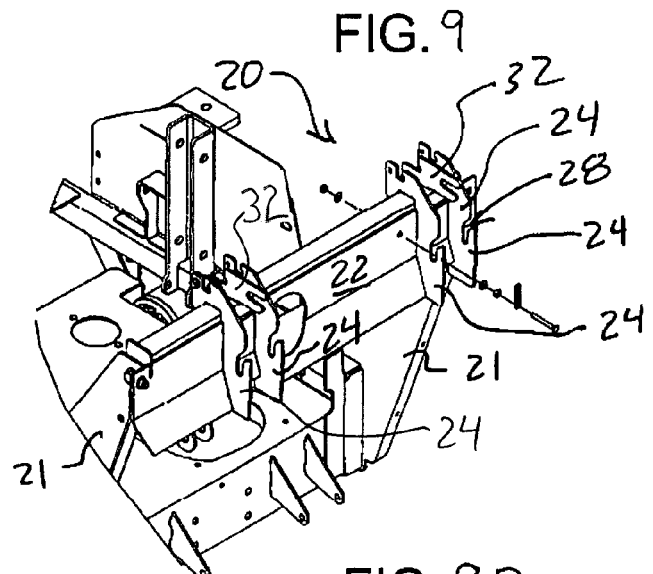
FIG. 9B

GRASS CATCHER APPARATUS FOR A RIDING LAWNMOWER

RELATED APPLICATIONS

This application claims the benefit of U.S. Provisional Patent Application Ser. No. 61/469,200 filed on Mar. 30, 2011, which is incorporated herein by reference.

FIELD OF THE INVENTION

This invention relates to a grass catcher assembly that can be installed or removed by a single operator.

BACKGROUND OF THE INVENTION

Riding lawnmowers are typically configured to operate in a non-collecting mode wherein grass clippings are deposited on the surface of the turf such as when clippings are discharged from the side or the rear of the or a catching mode wherein grass clippings are conveyed to containers which are often mesh bags supported by a grass catcher lid assembly mounted to the back end of the mower. Operators of riding lawn mowers and particularly professional operators often have a need to alternate between jobs where the customer accepts the non-collecting mode and jobs where the customer requests the collection of grass clippings. Accordingly, in the course of a work day including two or more job sites, it may be necessary to alternate between a job in which grass clippings are collected and a job in which grass clippings are not collected. Accordingly, when a job does not require the collection of grass clippings, it is preferable to remove the grass catcher apparatus in order to improve the maneuverability of the rear end of the riding lawn mower. Prior art grass catching systems for large riding lawn mowers often require at least two operators to remove or replace a grass clippings collection apparatus, or the effort to do so is difficult and time consuming for one operator. Moreover, with most grass catching systems, it is not possible to rotate a grass catcher lid assembly to a hanging, lowered or retracted position. What is needed is a grass clippings collection apparatus having a lid assembly that may be easily removed and replaced by a single operator. Further, what is needed is a grass catcher lid assembly that can be reoriented to a more favorable handling position by a single operator when the grass clippings collection apparatus is not in use or when the grass clippings collection apparatus is not in use.

SUMMARY

In order to overcome the above stated limitations there is provided an apparatus for mounting a grass collection unit to a riding lawn mower. In this example, the grass collection unit includes a lid assembly and may also include at least one removable or collapsible grass clipping collection container. A grass clipping collection container may take the form of a flexible mesh grass collection bag having a flexible mesh bag portion for holding grass clippings and an upper opening defined by a generally rigid open frame that presents an open upper end for receiving grass clippings into the bag. The apparatus also includes a mounting assembly that is fixed to the frame of the riding lawn mower. The mounting assembly is operable for supporting the grass collection unit.

The lid assembly is arranged so that it may be first hung by an operator in a hanging position and then rotated up into an operating position. When referring to a portion of the lid assembly as being upper or front or the like in the description below, the skilled reader should understand that the applicants are referring to the lid assembly in the operating position. The lid assembly has a front wall and at least one mounting feature extending from the front wall. When in an operating position, the lid assembly is generally level with the front wall generally upright and facing forward. When in the hanging position, the front wall is generally level and facing up and the lid assembly is generally hanging down from the front wall. In this example, the at least one mounting feature may preferably take the form of at least one generally transverse base pin that is preferably mounted adjacent to and spaced away from the lower edge of the front wall. Handles are preferably mounted to the front wall of the lid assembly for grasping by an operator. Preferably, the height of the front wall is less than the longitudinal width of the lid assembly. Accordingly, when an operator holds the lid assembly in the hanging position, the center of gravity of the lid assembly is substantially closer to the operator than if the operator were to hold the lid assembly with the lid assembly in the operating position. The lid assembly also has an inlet operable for receiving grass clippings or other plant material debris from a riding lawn mower and the lid assembly is configured so that plant material debris entering the inlet are distributed to the at least one grass clipping collection container.

The mounting assembly is fixed to the frame of the riding lawn mower. The mounting assembly presents at least one receiving feature that is adapted for receiving the at least one mounting feature of the lid assembly. The at least one receiving feature and the at least one mounting feature of the lid assembly are arranged so that when the operator holds the lid assembly in the hanging position and guides the mounting feature into the receiving feature, the at least one receiving feature receives the mounting feature of the lid assembly such that the operator may release the lid assembly as the lid assembly hangs on the mounting assembly. The at least one receiving feature and the at least one mounting feature are also arranged so that once the lid assembly is hung on the mounting assembly, it is possible for the operator to rotate the lid assembly from the hanging position to the operating position. In this example, the receiving feature may preferably take the form of at least one generally upright slot adapted for receiving the preferred transverse base pin-mounting feature described above. The lid assembly and the mounting assembly share a releasable latch mechanism that is operable for establishing a releasable connection between the lid assembly and the mounting assembly when the lid assembly is in the operating position. The releasable latch engages and secures the lid assembly in the operating position when the lid assembly is hung on the mounting assembly as described above and when the lid assembly is rotated from the hanging position to the operating position. It is further preferable that any grass clipping container associated with the lid assembly be either removed or substantially empty and collapsed or folded when the lid assembly is being mounted to or removed from the mounting assembly.

A second releasable latch mechanism may be shared between the lid assembly and the mounting assembly. The second latch mechanism is operable to secure the at least one mounting feature of the lid assembly to the at least one receiving feature of the mounting assembly when the lid assembly is rotated away from the hanging position toward the operating position. Preferably, the second latch mechanism would also be arranged to not secure the at least one mounting feature when the lid assembly is in the hanging position. Accordingly, as long as the lid assembly is in the hanging position, the second latch mechanism does not secure the mounting feature of the lid assembly and does not interfere with the installation or removal of the lid assembly.

BRIEF DESCRIPTION OF THE SEVERAL VIEWS OF THE DRAWINGS

FIG. 9 is a first perspective exploded view of the mounting assembly generally as viewed from the front and the left side.

FIG. 9A is a magnified side view of a latch member taken from plane A-A indicated in FIG. 6.

FIG. 9B is a second perspective exploded view of the mounting assembly generally as viewed from the rear and the left side.

DETAILED DESCRIPTION OF THE INVENTION

Figure 1:
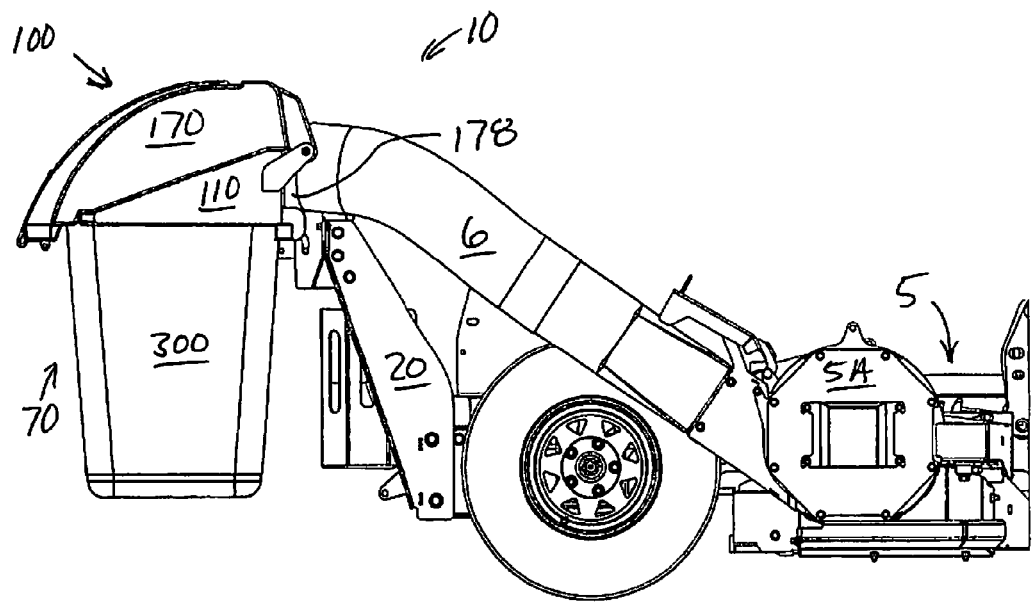
FIG. 1 is a right side view of the improved grass catcher lid assembly shown completely mounted to a riding lawn mower with the lid assembly in the raised, operating position with grass collection bags mounted to the lid assembly and with the lawn mower grass clippings duct attached to the grass inlet of the lid assembly.

Referring to the drawings, FIG. 1 shows an example embodiment of an improved grass clippings collection apparatus 10 installed on riding lawn mower 5. In this example, riding lawn mower 5 may be any riding lawn mower having a means for discharging grass clippings such as grass clippings conduit 6. As can be seen in FIG. 1, grass catcher assembly 10 includes a mounting assembly 20 and a grass clipping collection unit 70. Mounting assembly 20 is fixed to the frame of riding mower 5 preferably at the rear end of a riding mower 5. Grass clippings collection unit 70 is removably mounted to mounting assembly 20. As can be seen in FIG. 1, grass clipping collection unit 70 includes a lid assembly 100 which is, in this example, operable for carrying three reusable grass clipping collection bags of a type well known to those skilled in the art.

Figure 4:
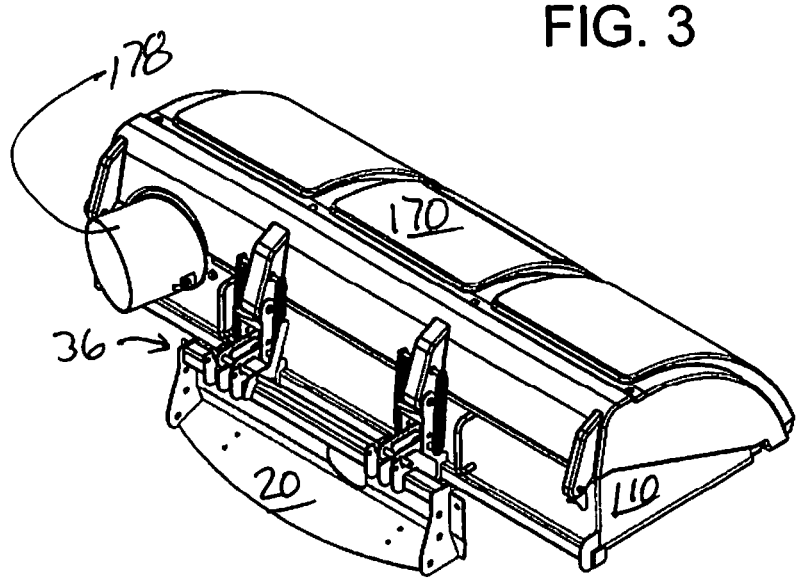
FIG. 4 is a perspective view of the improved grass catcher lid assembly shown completely mounted to a mounting assembly of a mower with the lid assembly in the raised operating position and with no grass collection bags mounted to the lid assembly.
Figure 5:
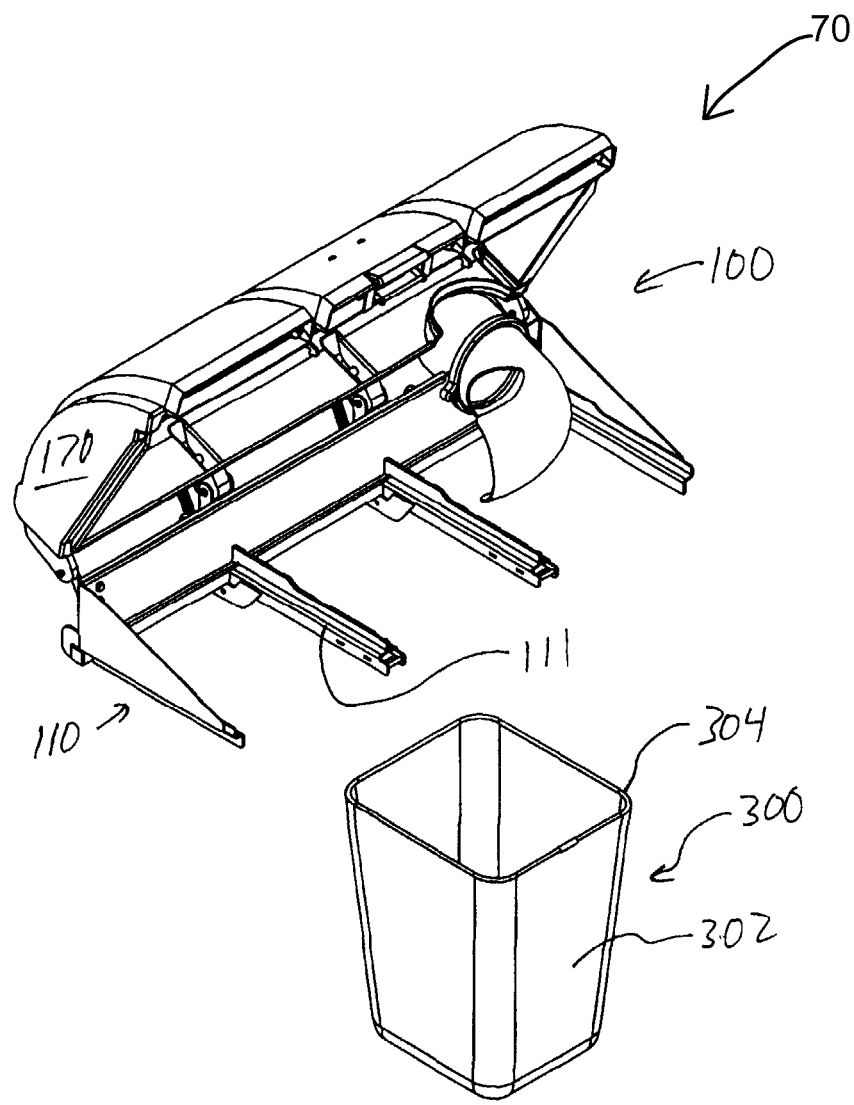
FIG. 5 is a perspective view of the improved grass catcher lid assembly shown with the upper portion of the lid assembly raised and with a grass clippings collection bag positioned for installation into the lower portion of the lid assembly.

As can be best seen in FIGS. 1 and 4, grass clipping collection unit 70 includes a lid assembly 100 and removable, reusable grass clipping collection bags 300. In this example, collection unit 70 includes three grass clipping collection bags 300. Collection bags 300 are of a type that is well known in the art. Collection bags 300 include a heavy fabric mesh sack portion 302 and a frame portion 304. Sack portion 302 is fashioned from an air permeable, strong, durable, mesh fabric suitable for retaining clippings while allowing sufficient air to escape so that grass clippings can be transported into grass clipping collection bags 300. Frame portion 304 is located at the upper end of sack portion 302 and provides a rigid, generally rectangular frame for supporting sack portion 302. Frame portion 304 is received and supported by lid assembly 100 while sack portion 302 hangs from frame portion 304 in a position suitable for receiving grass clippings. However, those skilled in the art will appreciate that grass clipping collection bags 300 may be replaced by any one of a number of grass clipping collection containers. It is, however, important to the operation of grass catcher apparatus 10 that the container or containers either be collapsible or removable.

As can be seen in FIG. 4, lid assembly 100 includes a lower portion 110 and an upper portion 170. Lower portion 110 is a generally strong, rigid structure which presents horizontal flanges 111 arranged, in this example, in three bays which are sized and spaced to receive and retain the frame portions 304 of bags 300. Preferably lower portion 110 is fashioned from strong steel tubing and sheet steel. In a commercial setting, lower portion 110 must be able to transfer considerable loads over many operating cycles as the riding lawnmower is traversing uneven or rough terrain.

Figure 6:
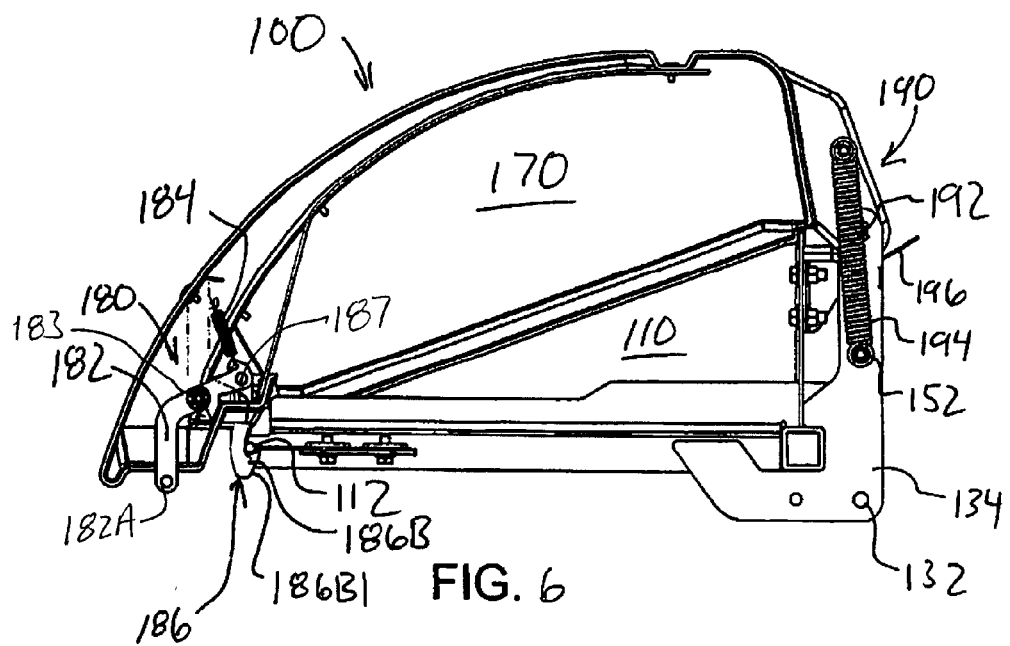
FIG. 6 is a cut away side view of the lid assembly showing the latch mechanism for securing the upper portion of the lid assembly to the lower portion of the lid assembly with the latch mechanism engaged.
Figure 7A:
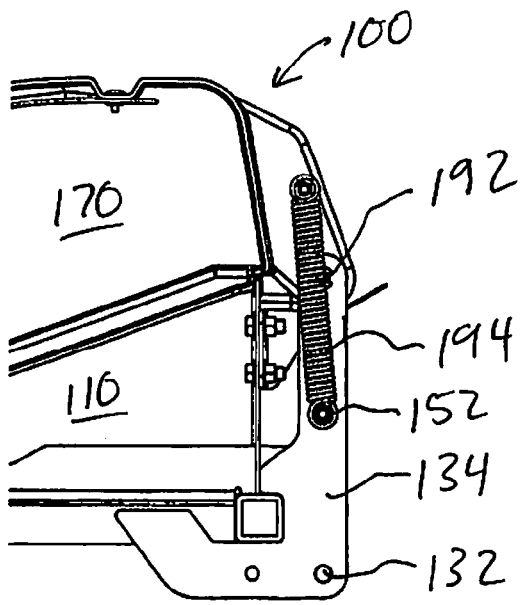
FIG. 7A is a partial cut away side view of the lid assembly showing the hinge arrangement between the upper portion and the lower portion of the lid assembly with the upper portion in the closed position.
Figure 7B:
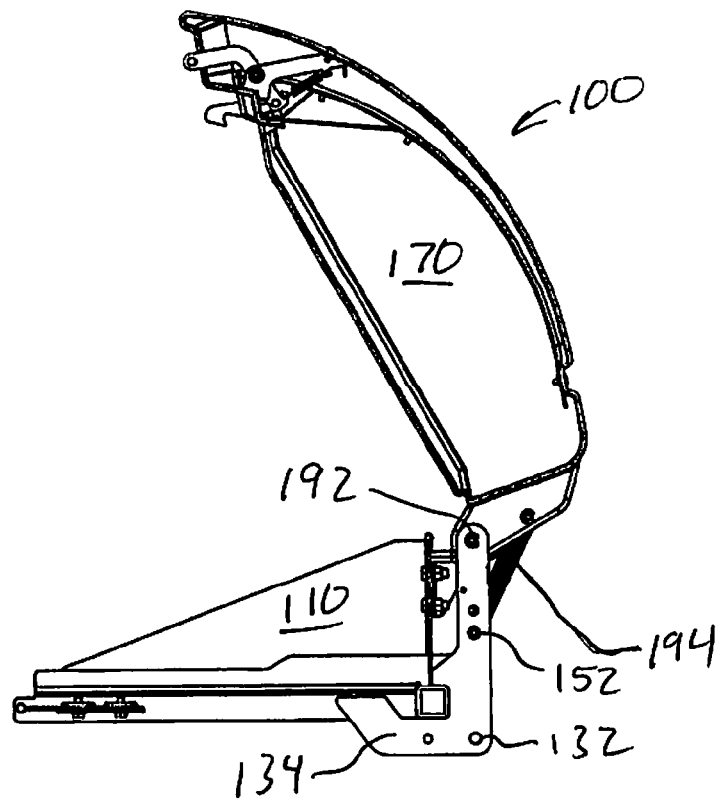
FIG. 7B is a full cut away side view of the lid assembly showing the hinge arrangement between the upper portion and the lower portion of the lid assembly with the upper portion in the open position.

As can be seen in FIGS. 6, 7A and 7B, upper portion 170 is hinged to lower portion 110 to tilt between a closed position shown in FIG. 6 and an open position shown in FIG. 7B. Upper portion 170 mainly functions as a shroud for directing the flow of grass clippings into bags 300. Generally, upper portion 170 does not transfer significant loads and may include molded plastic components and the like. In this example, upper portion 170 cooperates with lower portion 110 so that when upper portion 170 is in the closed position, each frame portion 304 of each collection bag 300 is secured and fixed in place.

As can be seen in FIG. 6, lid assembly 100 includes a releasable latch mechanism 180 operable for securing upper portion 170 in the closed position shown in FIG. 6. In this example, latch mechanism 180 includes a pivotably mounted handle element 182 that is biased by helical tension spring 184 in the latched position shown in FIG. 6. Handle element 182 is pivotably mounted by means of transverse bar 183. At one end of handle element 182 is a transverse handle 182A. A transverse rod 187 is fixed to the opposite end of handle element 182. A latch element is fixed to transverse rod 187. Thus latch element 186 rotates around the center of transverse bar 183 with handle 182A. Latch element 186 has a hook portion 186B at its distal end suitable for engaging a latch bar 112 which is fixed to lower portion 110. Handle element 182 includes a stop element 182A that makes contact with an inside surface of upper portion 170 which limits the upward travel of latch element 186 in response to spring 184.

Figure 6A:
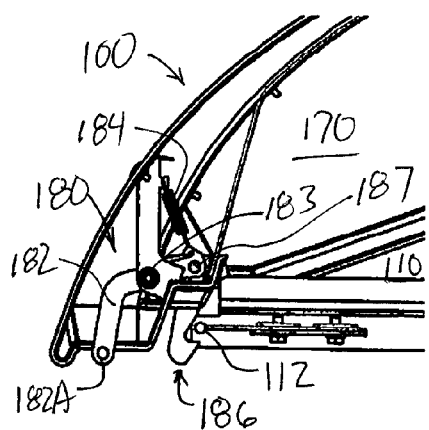
FIG. 6A is a partial cut away side view of the lid assembly showing the latch mechanism disengaged with the upper portion of the lid assembly closed.
Figure 6B:
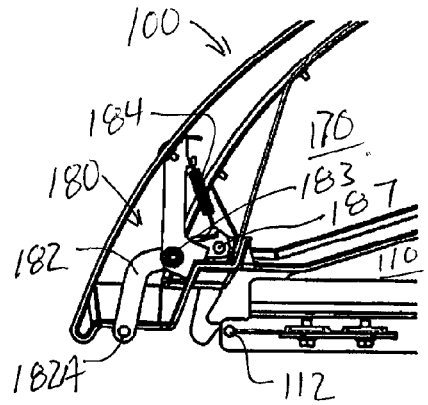
FIG. 6B is a partial cut away side view of the lid assembly showing the latch mechanism disengaged with the upper portion of the lid assembly partially open.
Figure 6C:
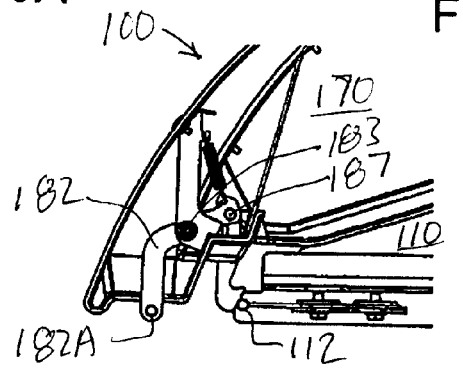
FIG. 6C is a partial cut away side view of the lid assembly showing the latch mechanism disengaged with the latch in its normal resting position with the upper portion of the lid assembly partially open as the upper portion rotates toward a closed position.

The operation of latch mechanism 180 can be understood by referring to FIGS. 6-6C. In FIG. 6, latch mechanism 180 is fully engaged so that latch element 186 engages latch bar 112 thereby holding upper portion 170 in the closed position. In FIG. 6A, handle element 182 has been pulled to the left as top end of latch element 186 has been pushed down and translated to the right. This motion causes hook portion 186B to translate down and to the left of latch bar 112 sufficiently to allow clearance of the end of hook portion 186B as upper portion 170 is rotated up as shown in FIG. 6B. FIG. 6C shows how as upper portion 170 is closed or dropped with handle element 182 released, an angled edge 186B1 of hook portion 186B contacts latch bar 112 which causes latch element 186 to lift and rotate clockwise in order to clear latch bar 112. After latch bar 112 clears latch element 186 as upper portion 170 moves to the closed position, latch element 186 returns to the latch bar 112 engaging position shown in FIG. 6 thus securing upper portion 170 in the closed position.

Figure 8:
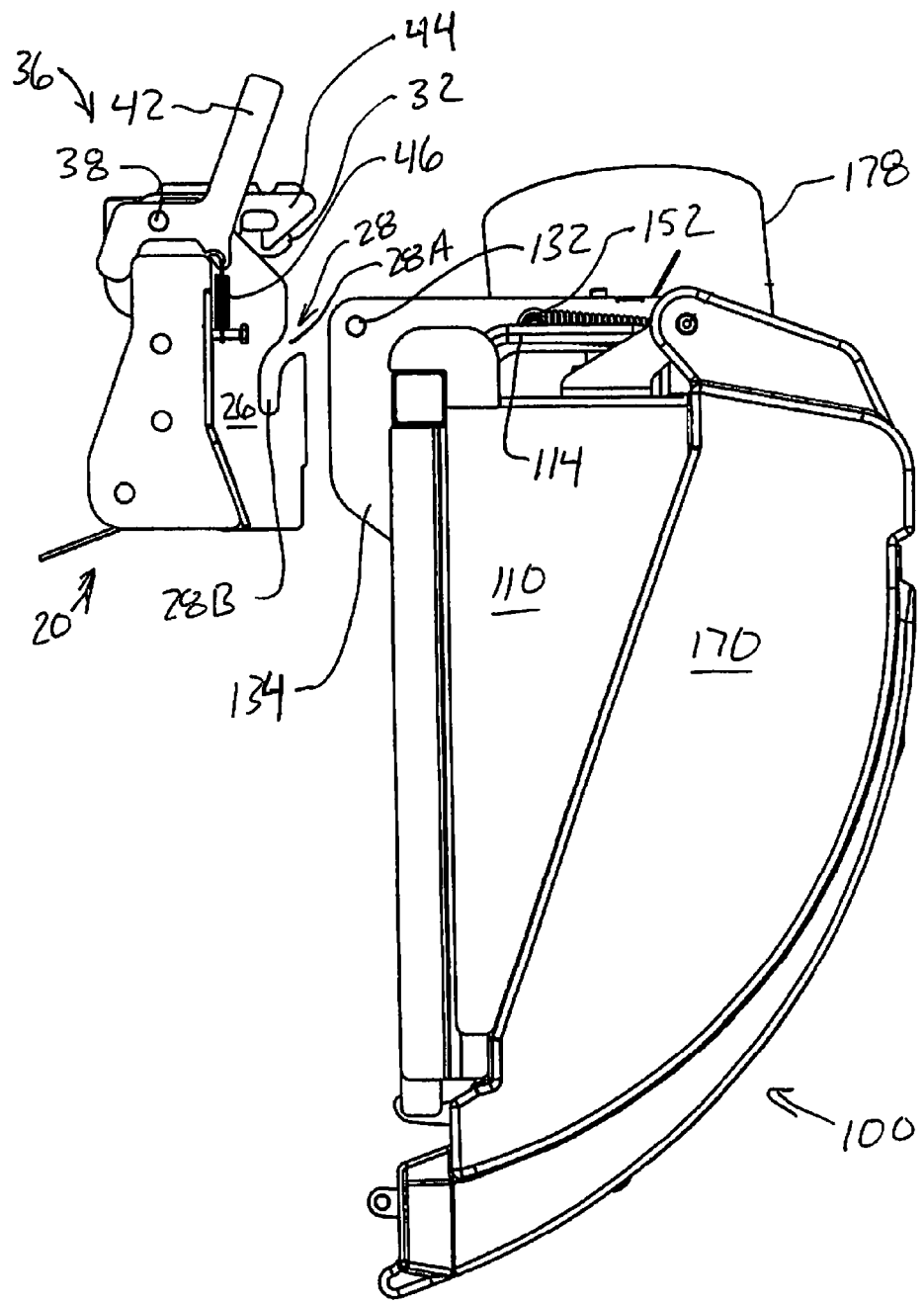
FIG. 8 is a left side view of a grass catcher lid assembly shown spaced away from the mounting assembly either before mounting the lid assembly to the mounting assembly or after the lid assembly has been removed from the mounting assembly.
Figures 8A, 8B:
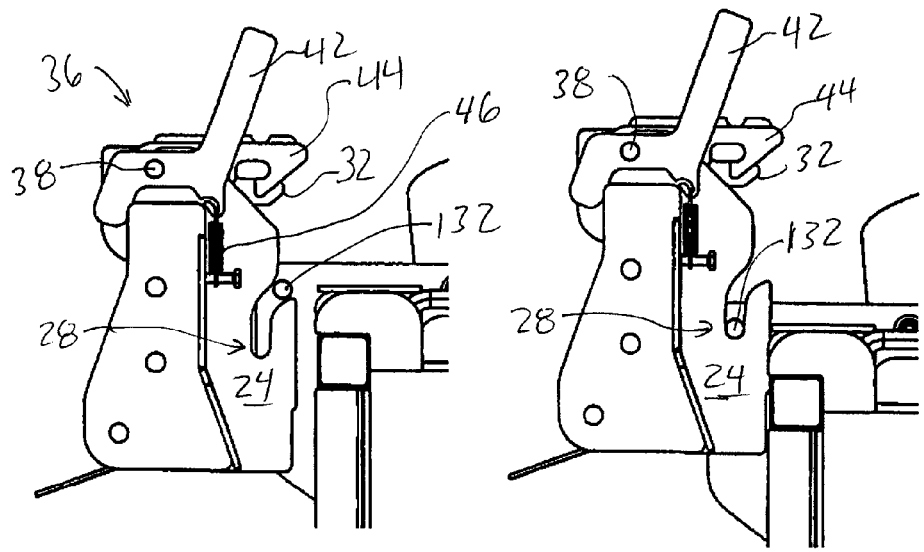
FIG. 8A is a partial left side view of a grass catcher lid assembly showing a lid assembly base pin entering the receiving portion of a slot of a mounting bracket of the mounting assembly with the lid assembly in the hanging position.
FIG. 8B is a partial left side view of a grass catcher lid assembly showing a base pin of the lid assembly retained in the retaining portion of a slot of a mounting bracket of the mounting assembly with the lid assembly in the hanging position.

In this example, lid assembly 100 preferably has an optional over center spring mechanism 190 which functions to hold upper portion 170 of lid assembly 100 in the closed position as shown in FIG. 6 and also operates to hold upper portion 170 in the open position as shown in FIG. 7A. As can be seen in FIG. 7A, upper portion 170 is pivotably mounted to lower portion 110 by means of a lug and clevis arrangement at a pivot joint 192. Preferably, the pivotal connection between upper portion 170 and lower portion 110 is accomplished by two spaced identical pivot joints 192. FIGS. 8A and 8B are side views showing only one of pivot joints 192. A helical tension spring 194 spans across pivot joint 192. The connections between spring 194 and lower portion 110 and upper portion 170 are arranged such that when upper portion 170 is closed, the connecting point between spring 194 and upper portion 170 is to the left of the axis of rotation of the joint. This arrangement causes the force exerted by spring 194 to urge upper portion 170 to a closed position. However, when upper portion 170 is rotated by manual force to the open position shown in FIG. 7B, the location of the connecting point between spring 194 and upper portion 170 is well to the right of the axis of rotation of the joint. This configuration causes spring 194 to urge upper portion 170 against a stop plate 196 which is mounted to lower portion 110 and thus urge upper portion 170 in the open position. This optional over center spring mechanism is very useful for the operator because it retains upper portion 170 in an open position so that grass clipping collection bags 300 can be easily removed and replaced as collection bags 300 are emptied or removed without the need to simultaneously manually hold upper portion 170 in the open position.

Figure 3:
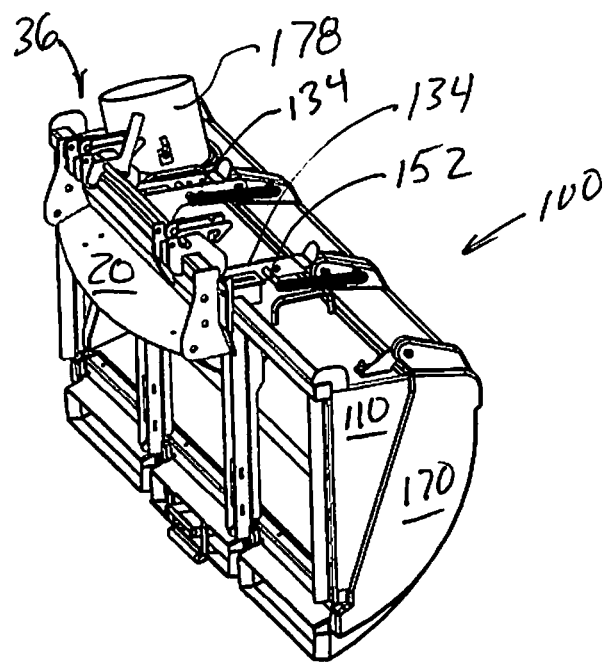
FIG. 3 is a perspective view of the improved grass catcher lid assembly shown partially mounted to a mounting assembly of a mower with the lid assembly in the hanging position with no grass clippings collection bags mounted to the lid assembly.

As can be seen in FIG. 3, lower portion 110 has a spaced pair of support brackets 134 mounted to the front wall of lower portion 110. As can be seen in FIGS. 4 and 8, support brackets 134 have a generally upright orientation (when lid assembly 100 is in the raised, operating position shown in FIG. 4) and each include two spaced parallel flanges which are suitable for supporting a base pin 132 and a latch pin 152. As noted above, support brackets 134 provide part of the structure for pivot joints 192. As can be seen in FIG. 8, support brackets 134 hold base pins 132 and latch pins 152 so that base pins 132 are spaced diagonally in front of and below the front, lower edge of the frame of lower portion 110 and so that latch pins 152 are spaced generally above base pins 132. (Latch pins 152 also provide attachment points for over center springs 194 described above which are part of the over center spring mechanism for biasing upper portion 170 in both the closed and open position as described above.)

FIGS. 9 and 9B provide exploded perspective views of mounting assembly 20 which is fixed to the rear end of mower 5 as viewed from the front and side. As can be seen in FIG. 9, mounting assembly 20 includes two spaced side supports 21 that are connected by a transverse support 22. A pair of lid assembly support brackets 24 which each include two identical spaced bracket flanges 24 are fixed to transverse support 22. A pair of stationary slot members 32 are also fixed to transverse support 22. Slot members 32 present generally rear opening horizontal stationary slots 32B for receiving latch pins 152 of lid assembly 100. The purpose of slot members 32 is to restrain latch pins 152 and therefore lid assembly 100 from being displaced upwardly as lid assembly 100 sustains upward loads as mower 5 is passing over uneven terrain.

As can be best seen in FIG. 9, lid assembly brackets 24 also carry a latch assembly 36. Latch assembly 36, in this example, is a substantial portion of a releasable latch mechanism connection between mounting assembly 20 and lid assembly 100. Latch assembly 36 operates to establish a releasable connection between lower portion 110 of lid assembly 100 and mounting assembly 20. Latch assembly 36 includes a transverse shaft 38 that is pivotably mounted to bracket flanges 24. Transverse shaft 38 carries two spaced pairs of latch members 44 and a handle 42. Latch members 44 are located and shaped to receive and retain latch pins 152 that are mounted to support brackets 134 of lower portion 110. A helical tension spring 46 is connected between handle 42 and transverse support 22 which biases latch assembly 36 in the closed position shown in FIGS. 8 and 8F.

Figures 8C, 8D:
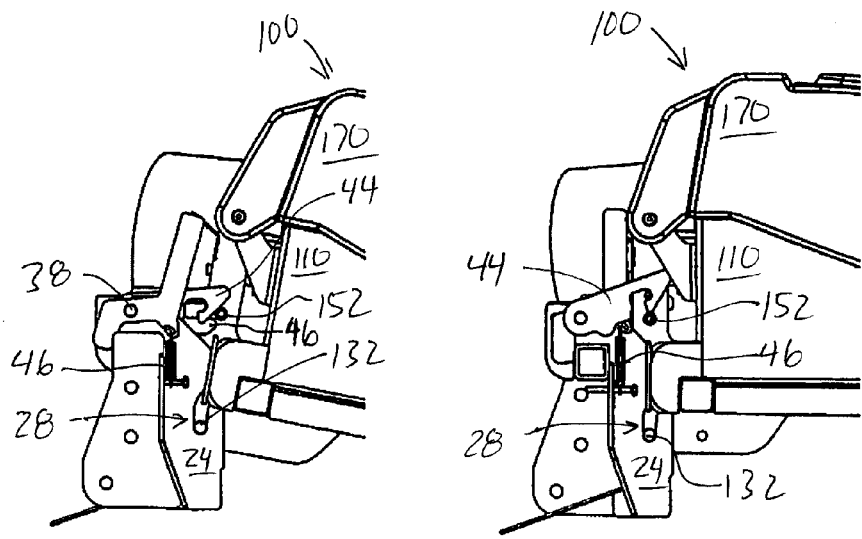
FIG. 8C is a partial left side view of a grass catcher lid assembly showing a base pin of the lid assembly being retained by the mounting bracket of the mounting assembly as the lid assembly is rotated toward the raised, operating position, as the latch pin of the lid assembly makes contact with the latch member of the latch assembly to begin urging the latch assembly to rotate in the counter-clockwise direction.
FIG. 8D is a partial left side view of a grass catcher lid assembly showing a base pin of the lid assembly being retained by the mounting bracket of the mounting assembly as the lid assembly further rotated toward the raised, operating position, as the latch pin of the lid assembly continues to make contact with the latch member of the latch assembly as the latch assembly finishes rotating in the counter-clockwise direction.
Figure 8E:
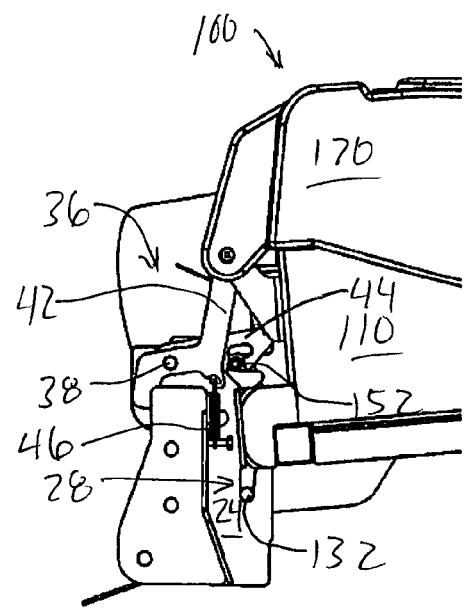
FIG. 8E is a partial left side view of a grass catcher lid assembly showing a base pin of the lid assembly being retained by the mounting bracket of the mounting assembly as the lid assembly is rotated slightly past the raised, operating position, as the latch pin of the lid assembly is received by the receiving portion of the slot of the latch member and as the latch assembly begins rotating toward its resting position as it captures the latch pin of the lid assembly.
Figure 8F:
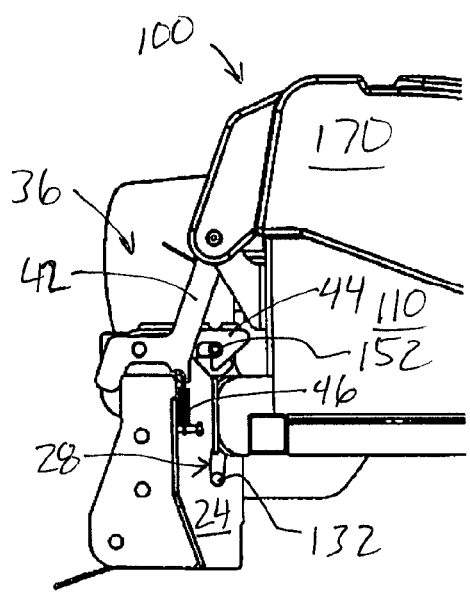
FIG. 8F is a partial left side view of a grass catcher lid assembly showing a base pin of the lid assembly being retained by the mounting bracket of the mounting assembly and the latch pin of the lid assembly retained by the latch member of the latch assembly with the lid assembly secured in the raised, operating position.
Figure 10:
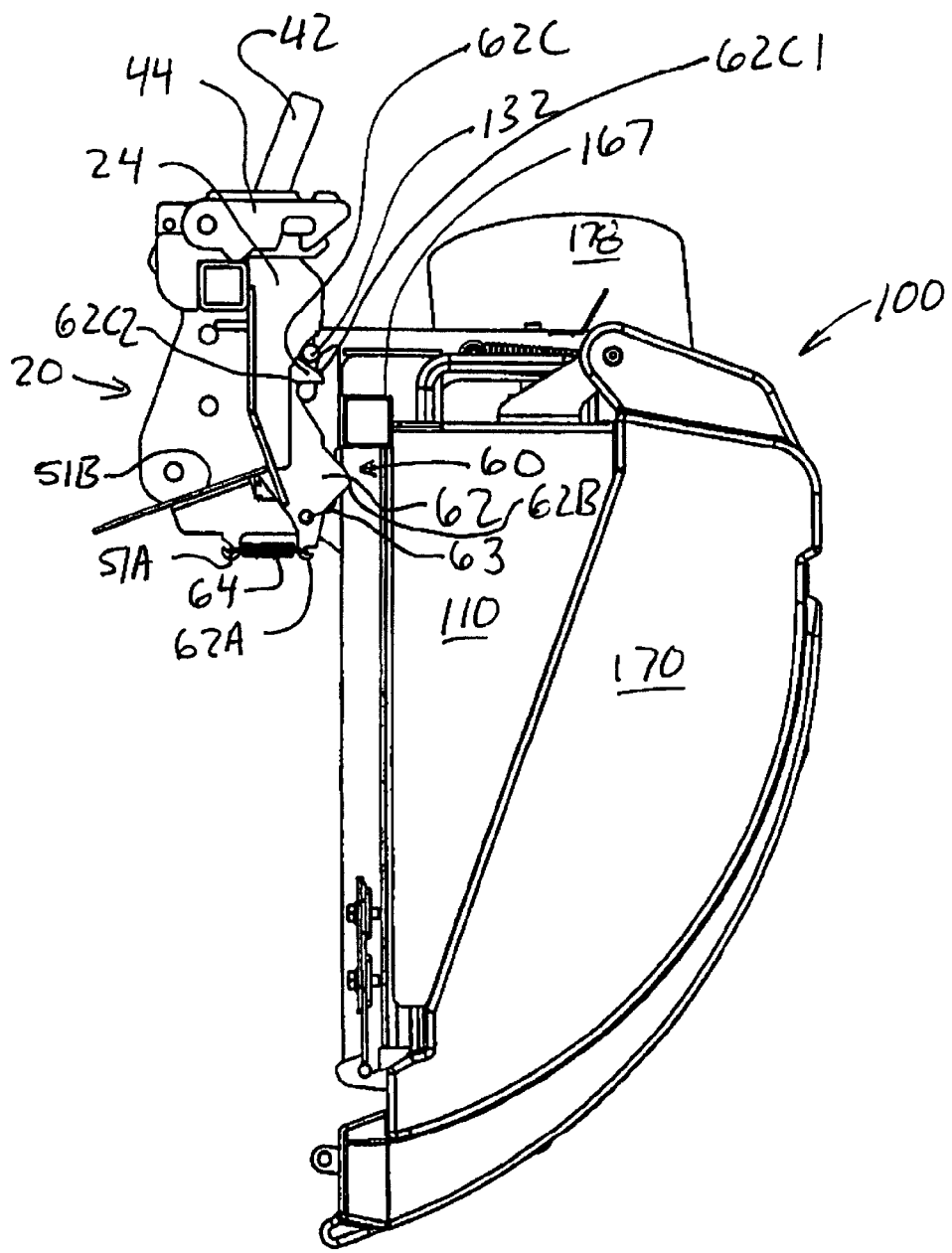
FIG. 10 is a side view of the lid assembly in the hanging position as the right side lid assembly base pin is entering the receiving portion of a slot in the right side mounting bracket of the mounting assembly, shown with an additional base pin latch mechanism for securing the base pin in the slot.

In this example, as can be seen in FIG. 10, at least one of latch members 44 has a downwardly protruding feature that contacts a top surface of transverse support 26 of lid assembly lower portion 110 in order to retain latch assembly 36 in the position shown in FIGS. 6 and 6F when latch assembly 36 is at rest. As can be seen in FIG. 9A, each latch member 44 includes a sloped edge 44A and an opening 44B. As is further shown in FIG. 9A, opening 44B has a receiving portion 44B1 and a retaining portion 44B2. Sloped edge 44A is shaped to contact latch pin 152 and cause latch member 44 and latch assembly 36 to rotate in a counter-clockwise direction as can be best seen in FIGS. 8C and 8D. As latch pin 152 continues to move left, as seen in FIGS. 8C and 8D, latch member 44 and latch assembly 36 rotate counter-clockwise. As can be seen in FIG. 8E, receiving portion 44B1 of opening 44B receives latch pin 152. Because of its spring bias, latch member 44 rotates clockwise and captures latch pin 152 in retaining portion 44B2 of opening 44B. The skilled reader will readily appreciate that these interactions are repeated on both sides of mounting assembly 20 and lid assembly 100 as both latch pins 152 are captured by all four latch members 44 shown in FIG. 4. When lid assembly 100 is in the position shown in FIG. 8E, latch members 44 rotate until the upper edges of openings 44B contact latch pins 152, so that, when the operator releases lid assembly 100, latch pins 152 pull away from mounting assembly 20 and become captured in retaining portions 44B2 of openings 44B of latch members 44 as shown in FIG. 8F. An operator releases latch pins 152 from latch assembly 36 by lifting lid assembly 100 thereby rotating latch pins 152 toward receiving portions 44B 1 of openings 44B of latch members 44 and then by rotating latch assembly 36 counter clockwise against its spring bias as viewed in FIG. 8E. This action releases latch pins 152 and allows the operator to rotate lid assembly 100 back to the hanging position as shown in FIG. 8.

The installation of lid assembly 100 onto mounting assembly 20 can be best understood by referring to FIGS. 8-8F. This operation is accomplished with two basic phases or steps. In the first phase or step, the operator holds lid assembly by its handles 114 and hangs lid assembly 100 on lid assembly brackets 24 of mounting assembly 20. In FIG. 8, lid assembly 100 is shown in the position it would be when held by an operator (not shown) holding lid assembly 100 by handles 114. The operator would be on the right side of lid assembly 100 (as seen in FIG. 7) with his or her arms extended with base pins 132 spaced away from the operator. As can be seen in FIG. 8A, the operator has maneuvered lid assembly 100 until base pin 132 is located at the opening of slot 28 of lid assembly bracket 24. As can be seen in FIG. 8A, slot 28 includes a receiving portion 28A and a retaining portion 28B. In FIG. 8A, base pin 132 is entering receiving portion 28A. In FIG. 8B, the operator has been able to release lid assembly 100 as base pin 132 has been received and captured by retaining portion 28B of slot 28 such that lid assembly 100 is supported in the hanging position shown in FIG. 8B.

Figure 2:
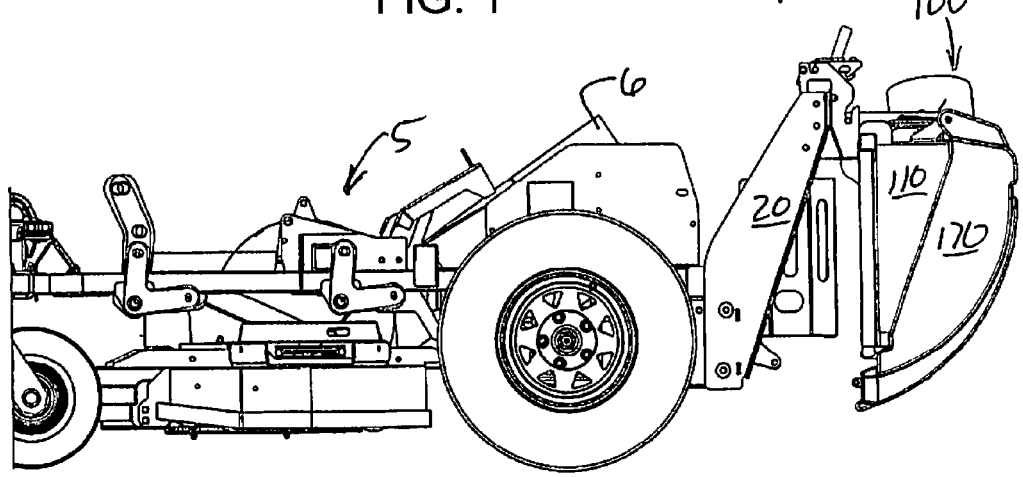
FIG. 2 is a left side view of the improved grass catcher lid assembly shown partially mounted to a riding lawn mower with the lid assembly in the hanging position with no grass clippings collection bags mounted to the lid assembly.

In order to mount lid assembly 100 in a position suitable for receiving and holding grass clipping collection bags 300, the operator must execute the second step, wherein the operator rotates lid assembly 100 from the hanging position shown in FIGS. 2 and 8B to the raised, operating position shown in FIGS. 1 and 8F. As the operator rotates lid assembly 100, latch pins 152 make contact with sloped edges 44C of latch members 44 and are captured by openings 44B as described above. At this point, lid assembly 100 is firmly mounted to mounting assembly 20 and is suitably arranged for receiving and holding grass clipping collection bags 300.

Figure 10A:
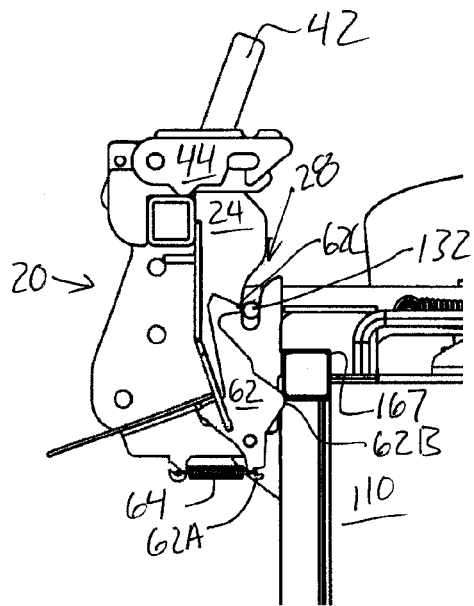
FIG. 10A is a partial side view of the lid assembly in the hanging position as the right side lid assembly base pin is entering the retaining portion of a slot in the right side mounting bracket of the mounting assembly as a latch member of the base pin latch mechanism is rotated away from engaging the base pin as portions of the lower portion of the lid assembly contact a cam portion of the latch member.
Figure 10B:
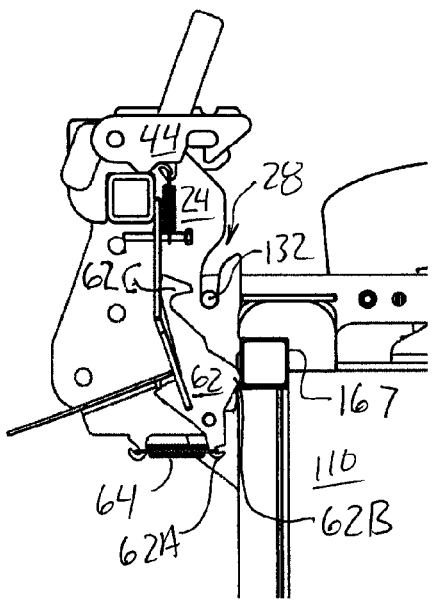
FIG. 10B is a partial side view of the lid assembly in the hanging position as the right side lid assembly base pin is in the retaining portion of a slot in the right side mounting bracket of the mounting assembly with the latch member of the base pin latch mechanism rotated away from engaging the base pin as the lower portion of the lid assembly presses against a cam surface of the latch member.
Figure 10C:
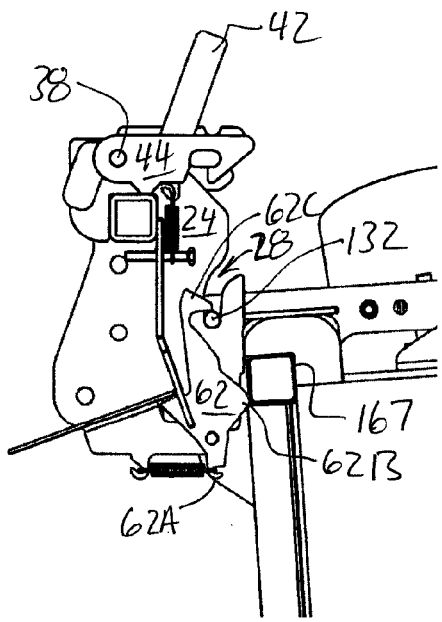
FIG. 10C is a partial side view of the lid assembly shown slightly rotated away from the hanging position as the latch member partially closes over the base pin thereby trapping the lid assembly base pin in the retaining portion of the slot.
Figure 10D:
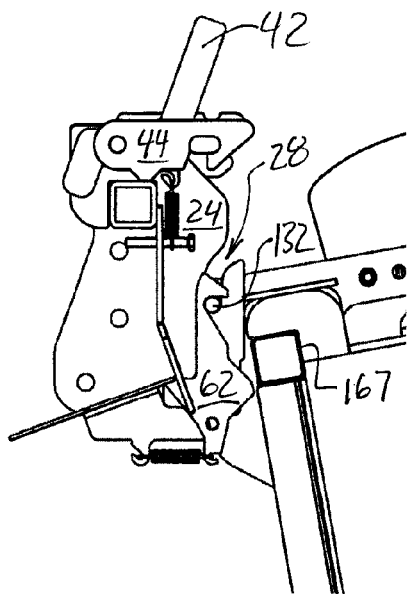
FIG. 10D is a partial side view of the lid assembly shown rotated away from the hanging position slightly more than shown in FIG. 10C with the base pin latch member completely closed over the lid assembly base pin trapping the lid assembly base pin in the retaining portion of the slot.

Because it is likely that at least one of base pins 132 will become unseated when an operator rotates lid assembly 100 away from the hanging position, it is preferable to have a second latch mechanism that captures and secures base pins 132 when lid assembly 100 is rotated away from the hanging position. A base pin latch mechanism 60 is shown in FIGS. 10-10D. Base pin latch mechanism 60 is operable for retaining base pins 132 in retaining portions 28B of slots 28 of bracket flanges 24 when an operator rotates lid assembly 100 from the hanging position shown in FIG. 10B to a position rotated away from the hanging position as shown in FIGS. 10C and 10D. What the skilled reader will understand from FIGS. 10-10D is that base pin latch mechanism 60 is repeated on both sides of mounting assembly 20 and that FIGS. 10-10D only show a side view of the left side and that everything shown and described regarding latch mechanism 60 should be understood as repeated on opposite sides of mounting assembly 20. As can be seen in FIG. 10, latch mechanism 60 includes a latch member 62 that is pivotably mounted to mounting assembly 20 at a pivot joint 63. Latch member 62 is biased in the closed position shown in FIG. 10 by a helical tension spring 64 which connects between a notch 51A defined mounting assembly 20 and a notch 62A defined in the lower end of latch member 62. A stop 51B prevents latch member 62 from over rotating when biased by spring 64 in the closed position shown in FIG. 10. Latch member 62 has a projecting cam surface 62B which is shaped to contact a surface of one of the frame members of lower portion 110 of lid assembly 100 in a manner that will be described in detail bellow. At the upper end of latch member 62 is a hook portion 62C. Hook portion 62C further includes an angled edge 62C1.

The operation of base pin latch mechanism 60 can be best understood by referring to FIGS. 10-10D. In FIG. 10, base pins 132 are descending into slots 28 of support brackets 26. As they do so, as shown in FIG. 10, base pin 132 contacts angled edge 62C1 of hook portion 62C thus causing latch member 62 to rotate counter clockwise toward the open position shown in FIG. 10A. Also, as can be seen in FIG. 10A, a portion of the frame of lower portion 110 of lid assembly 100 is in contact with cam surface 62B further urging latch member 62 in the open position. As can be seen in FIG. 10B, base pin 132 is seated in the bottom of slot 28 and cam surface 62B which is in contact with a portion of the frame of lid assembly 110 is urging latch member 62 in the open position. The function of base pin latch mechanism 60 as it retains base pins 132 comes into play when an operator rotates lid assembly 110 away from the hanging position shown in FIG. 10B even slightly as shown in FIG. 10C. As can be seen in FIG. 10C, the portion of lid assembly 100 in contact with cam surface 62B has rotated away from mounting assembly 20 to allow hook portion 62C to sufficiently cover base pin 132 to retain base pin 132. As can be seen in FIG. 10D, hook portion 62C has rotated to fully capture base pin 132 as lid assembly 100 has rotated only partially toward the raised, operating position, thereby retaining base pins 132 in the bottom of slots 28. As can be seen in FIG. 10A, when lid assembly 100 is in the hanging position, latch member 62 is disengaged from base pins 132 and continues to be disengaged even as lid assembly 100 moves vertically between the positions shown in FIGS. 10A and 10B. Accordingly, latch assembly 60 operates to capture and retain base pins 132 when lid assembly 100 is rotated from the hanging position shown in FIG. 10B even slightly as shown in FIG. 10C toward the raised operating position, but is also adapted to not capture or obstruct base pins 132 when lid assembly 100 is being raised and lowered along an upright path between a non-mounted position as shown in FIG. 10 and the hanging position as shown in FIG. 10B.

Figure 11:
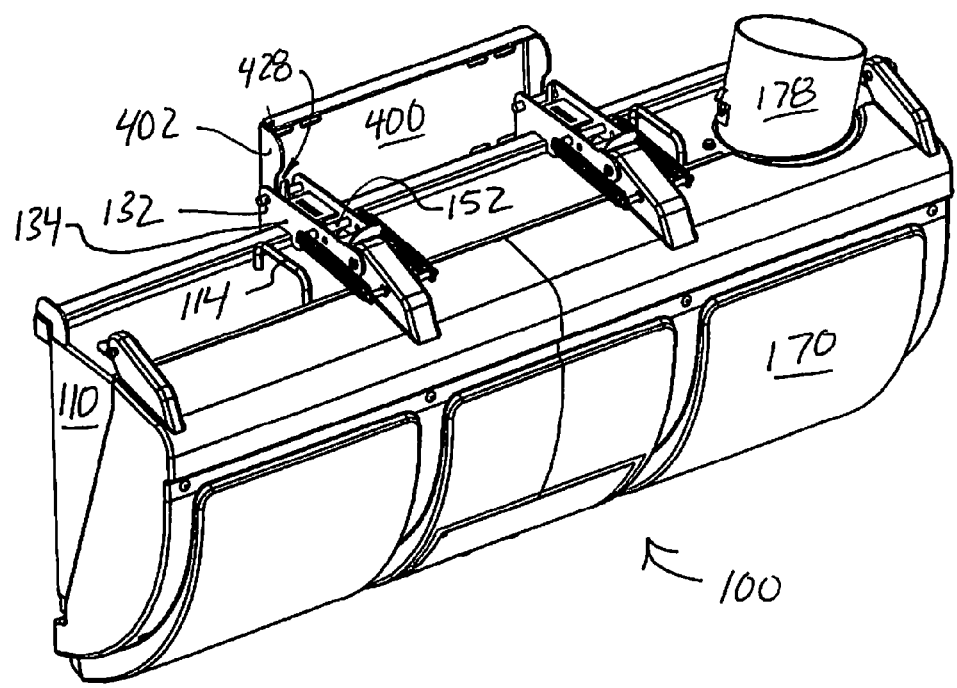
FIG. 11 is a perspective view showing the lid assembly mounted on a wall mount for storage.

Because it is useful to be able to operate mower 5 with grass catcher apparatus 10 installed or with grass catcher apparatus 10 not installed, it is useful to be able to store lid assembly 100 when it is not in use. As can be seen in FIG. 11, a bracket 400 has spaced side flanges 402 which each have slots that are also spaced to receive base pins 132 lid assembly 100. As can be seen in FIG. 11, an operator may lift lid assembly 100 using handles 114 and hang lid assembly 100 on bracket 400. Bracket 400, in this example, is fashioned from strong, heavy gauge formed sheet metal and may be produced a relatively low cost. Accordingly, an operator may mount a bracket 400 in various locations, such as, for example, the building where mower 5 is housed and also upon the trailer used to transport mower 5 (in the case of a commercial mowing operation) so that lid assembly may be conveniently stored.

As can be understood from the above detailed description, lid assembly 100 is designed so that one operator can lift and hang lid assembly 100 on mounting assembly 20 and then rotate lid assembly up toward a raised, operating position in which the releasable latch mechanism described above, which, in this example, is connected to mounting assembly 20 receives and secures lid assembly 100 in the raised, operating position. With lid assembly 100 in the raised, operating position, it is possible for an operator to install grass clipping collection bags 300. As shown in FIG. 1, the operator also attaches grass clipping duct 6 to grass clippings inlet fitting 178. If grass clipping duct 6 is properly attached to the grass clipping blower 5A of mower 5, then grass clipping will flow in a stream of air from the mower deck, into upper portion 110 of lid assembly 100 where the clippings will be distributed into grass clipping collection bags 300. In a series of steps generally in reverse of those described above, the operator may remove bags 300, disconnect clippings duct 6, release latch mechanism 36 retaining lid assembly 100 in the raised operating, position, tilt lid assembly 100 into the lowered, hanging position and then lift lid assembly up and away from mounting assembly 20. Accordingly, grass catcher apparatus 10 provides a way to selective collect clippings while having the capability to alternate between a configuration in which grass clippings are collected and a configuration wherein grass clippings are not collected while requiring the effort of only one operator.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for mounting a grass collection unit to a riding lawn mower, comprising:
   (a) a mounting assembly fixed to the riding lawnmower, the mounting assembly presenting at least one upright slot having a receiving portion and a retaining portion and at least one releasable latch that is spaced above the at least one upright slot,
   (b) a grass collection unit including a lid assembly with an inlet for receiving grass clippings, the lid assembly having generally horizontal flanges suitable for receiving and supporting an upper frame of at least one grass clipping collection bag of the type having an open upper end and an upper frame extending around the open upper end of the grass clipping collection bag, the lid assembly also having at least one base pin and at least one latch pin which is spaced away from the base pin,
   (c) the at least one upright slot of the mounting assembly, the at least one latch of the mounting assembly, the at least one base pin of the lid assembly and the at least one latch pin of the lid assembly arranged such that the lid assembly may be manually held in a hanging position as the at least one base pin is manually guided into the receiving portion of the at least one upright slot and dropped into the retaining portion of the of the at least one upright slot thereby hanging the lid assembly on the mounting assembly, the lid assembly also rotatable to a raised, operating position in which the latch pin of the lid assembly is received and captured by the at least one releasable latch of the mounting assembly thereby releasably securing the lid assembly in an operating position suitable for receiving and holding at least one grass clipping collection bag.

2. The apparatus of claim 1, further comprising:
   a second releasable latch mechanism associated with the mounting assembly, the second releasable latch mechanism operable for securing the base pin to the upright slot when the lid assembly is rotated from the hanging position toward the raised operating position, the second releasable latch mechanism also operable for releasing the base pin when the lid assembly is returned to the hanging position.

3. An apparatus for mounting a grass collection unit to a riding lawn mower, comprising:
   (a) a lid assembly having a front wall and at least one transverse base pin spaced away from the front wall and at least on latch pin, the lid assembly positionable in an operating position and a hanging position, the operating position characterized by the lid assembly being level with the front wall being upright and facing forward, the hanging position characterized by the front wall of the lid assembly being level and facing up with the lower edge of the front wall facing forward, the lid assembly further having an inlet suitable for receiving grass clippings or other plant material debris from a riding lawn mower, (b) a mounting assembly fixed to the frame of the riding lawn mower, the mounting assembly presenting at least one upright slot that is adapted for receiving the at least one transverse base pin of the lid assembly, the at least one upright slot of the mounting assembly and the at least one transverse base pin of the lid assembly arranged so that when an operator holds the lid assembly in the hanging position and guides the transverse base pin into the upright slot, the at least one upright slot of the mounting assembly receives the transverse base pin of the lid assembly such that the operator may release the lid assembly as the lid assembly is supported by the mounting assembly, the at least one upright slot and the at least one transverse base pin also arranged so that once the lid assembly is hung on the mounting assembly, it is possible to rotate the lid assembly up into the operating position, (c) a releasable latch mechanism associated with the mounting assembly that is operable for establishing a releasable connection between the lid assembly and the mounting assembly, the releasable latch mechanism securing the lid assembly in the operating position when the lid assembly is supported by the mounting assembly and when the lid assembly is rotated from the hanging position to the operating position, whereby an operator may hold a lid assembly in the hanging position, guide the lid assembly so that the at least one transverse pin of the lid assembly is received by the at least one upright slot of the mounting assembly, rotate the lid assembly from the hanging position to the operating position so that the releasable latch mechanism receives the at least one latch pin of the lid assembly and thereby establishes a releasable connection between the mounting assembly and the lid assembly thereby securing the lid assembly in the operating position.

4. The apparatus of claim 3, further comprising:
a second releasable latch mechanism associated with the mounting assembly, the second releasable latch mechanism operable for securing the base pin to the upright slot when the lid assembly is rotated from the hanging position toward the raised operating position, the second releasable latch mechanism also operable for releasing the base pin when the lid assembly is returned to the hanging position.

5. An apparatus for mounting a grass collection unit to a riding lawn mower, comprising:

(a) a mounting assembly fixed to the riding lawnmower, the mounting assembly presenting two laterally spaced upright slots and at least one releasable latch that is spaced above the at least one of the upright slots, (b) a grass collection unit including a lid assembly with an inlet for receiving grass clippings, the lid assembly having generally horizontal flanges suitable for receiving and supporting an upper frame of at least two grass clipping collection bags of the type having an open upper end and an upper frame extending around the open upper end of the grass clipping collection bag, the lid assembly also having at least two base pin portions and at least one latch pin which is spaced away from at least one of the base pin portions, (c) the upright slots of the mounting assembly, the at least one latch of the mounting assembly, the at least two base pin portions of the lid assembly and the at least one latch pin of the lid assembly arranged such that the lid assembly may be manually held in a hanging position as the at least two base pin portions are manually guided into the upright slots thereby hanging the lid assembly on the mounting assembly, the lid assembly also rotatable to a raised, operating position in which the at least one latch pin of the lid assembly is received and captured by the at least one releasable latch of the mounting assembly thereby releasably securing the lid assembly in a raised, operating position suitable for receiving and holding at least two grass clipping collection bags.

* * * * *